United States Patent
Ma (10) Patent No.: US 9,141,894 B2
(45) Date of Patent: Sep. 22, 2015

(54) IMAGE FORMATION APPARATUS, IMAGE FORMATION SYSTEM AND IMAGE FORMATION METHOD

(71) Applicant: Oki Data Corporation, Tokyo (JP)

(72) Inventor: Jun Ma, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/093,079

(22) Filed: Nov. 29, 2013

(65) Prior Publication Data

US 2014/0153051 A1 Jun. 5, 2014

(30) Foreign Application Priority Data

Nov. 30, 2012 (JP) .................................. 2012-263459

(51) Int. Cl.
G06F 15/00 (2006.01)
G06K 15/02 (2006.01)
G06K 15/00 (2006.01)
H04N 1/00 (2006.01)
H04N 1/387 (2006.01)
G06F 3/12 (2006.01)

(52) U.S. Cl.
CPC .......... *G06K 15/1885* (2013.01); *G06F 3/1204* (2013.01); *G06F 3/1258* (2013.01); *G06F 3/1285* (2013.01); *G06K 15/1868* (2013.01); *G06K 15/4065* (2013.01); *H04N 1/00278* (2013.01); *H04N 1/00352* (2013.01); *H04N 1/00689* (2013.01); *H04N 1/00694* (2013.01); *H04N 1/00708* (2013.01); *H04N 1/3872* (2013.01); *H04N 1/3877* (2013.01); *G06F 3/1252* (2013.01)

(58) Field of Classification Search
CPC ............................... G06F 3/1285; H04N 1/387
USPC .......................................................... 358/1.18
See application file for complete search history.

(56) References Cited

U.S. PATENT DOCUMENTS

| | | | | |
|---|---|---|---|---|
| 6,168,327 | B1* | 1/2001 | Tsuzuki | 400/188 |
| 2007/0179037 | A1* | 8/2007 | Dobrovolsky | 493/480 |
| 2009/0257095 | A1* | 10/2009 | Delfer et al. | 358/304 |

FOREIGN PATENT DOCUMENTS

| | | | |
|---|---|---|---|
| JP | H09-123562 | A | 5/1997 |
| JP | 2005-231131 | A | 9/2005 |
| JP | 2006-089186 | A | 4/2006 |
| JP | 2009-064266 | A | 3/2009 |

* cited by examiner

Primary Examiner — Saeid Ebrahimi Dehkordy
(74) Attorney, Agent, or Firm — Marvin A. Motsenbocker; Mots Law, PLLC (57) ABSTRACT

An image processing method includes a page layout adjustment step of converting image data to create print data having a page layout such that, when printed sheets each of which has a specified number of pages are discharged from an image formation apparatus thereby forming a stack of the printed sheets in the discharged order and in a case where the stack of the printed sheets are cut into the specified number of separated stacks corresponding to the page layout, the stack order of the cut printed sheets in each of the separated stacks corresponds to a sequence page order.

12 Claims, 10 Drawing Sheets

FIG.4A
PRINT PROCESSING OF COMPARATIVE EXAMPLE

BROKEN LINES ARE CUTTING POSITIONS AND DIRECTIONS

CUTTING_WHEN A4 PAPER RUNS OUT DURING PRINTING

AFTER CUTTING, PRINTED PAGES ARE NOT IN ORDER

FIG.4B
PRINT PROCESSING OF COMPARATIVE EXAMPLE

BROKEN LINES ARE CUTTING POSITIONS AND DIRECTIONS

CUTTING_WHEN THERE IS NO DESIGNATED SIZE PAPER FROM START

FIG.6A
PRINT PROCESSING OF EMBODIMENT 1

BROKEN LINES ARE CUTTING POSITIONS AND DIRECTIONS

CUTTING_WHEN A4 PAPER RUNS OUT DURING PRINTING

AFTER CUTTING, PRINTED PAGES ARE ARRANGED IN PAGE ORDER FROM TOP WITHOUT CHANGE

FIG.6B
PRINT PROCESSING OF EMBODIMENT 1

BROKEN LINES ARE CUTTING POSITIONS AND DIRECTIONS

CUTTING_WHEN THERE IS NO DESIGNATED SIZE PAPER FROM START

IMAGE FORMATION APPARATUS, IMAGE FORMATION SYSTEM AND IMAGE FORMATION METHOD

CROSS REFERENCE TO RELATED APPLICATIONS

This application claims priority based on 35 USC 119 from prior Japanese Patent Application No. 2012-263459 filed on Nov. 30, 2012, entitled "IMAGE FORMATION APPARATUS AND IMAGE FORMATION SYSTEM", the entire contents of which are incorporated herein by reference.

BACKGROUND OF THE INVENTION

1. Field of the Invention

This disclosure relates to an image formation apparatus and an image formation system configured to form an image on a sheet-shaped printing medium such as a print sheet.

2. Description of Related Art

Generally, when print sheets of a size set by an application program (hereinafter referred to as the "AP") in a higher-level device run out, an image formation apparatus suspends an image formation process and notifies a user of such a paper-out condition by using an information display unit such as an operation panel in the image formation apparatus or a status monitor in the higher-level device.

Also, there has been disclosed an image formation apparatus configured to perform printing by reducing or enlarging such suspended image data and switching to alternative sheets, and has been disclosed an image formation apparatus configured to perform printing by switching to alternative sheets without changing (i.e., without reducing or enlarging) the image size of the image data, as disclosed in Patent Document 1 (Japanese Patent Application Publication No. 2006-89186).

SUMMARY OF THE INVENTION

However, the conventional image formation apparatus forms images using the alternative sheets of a different size. For this reason, even when the images of the same size as the images to be printed on print sheets of the user-specified size are formed on the alternative sheets, the printed alternative sheets needs to be collectively cut and separated into the size desired by the user after the completion of printing. This brings about an inconvenience in which it is troublesome to arrange the separated paper sheets of the desired size according to the print page number.

An embodiment of the invention aims to improve user-convenience.

One aspect of the invention is an image formation apparatus. The image formation apparatus includes: storage units configured to store printing media therein; medium detection sensors provided in the respective storage units and each configured to detect whether or not there is a printing medium in the corresponding storage unit and output a medium detection signal; size detection sensors provided in the respective storage units and each configured to detect the size of the printing media in the corresponding storage unit and output a size detection signal; an image formation unit configured to receive print data and print images on the printing media; conveyance units each configured to convey the printing media in the corresponding storage unit toward the image formation unit; a display unit configured to receive display information including information on switching to the printing media and display the display information; an input and setting unit configured to receive a user input; an image data output unit configured to output image data, perform layout processing of print contents of the image data, and output layout-processed data of the layout processing; a size switch control unit configured to control switching to alternative size printing media detected by the size detection sensor and output information on the switching to the alternative size printing media; and an image processing unit. The image processing unit is configured: to receive the information on the switching to the alternative size printing media and transmits the information to the display unit; to obtain a to-be-printed page number by counting the number of pages yet to be printed in the printing media or the alternative size printing media, to receive control information including the medium detection signal, the size detection signal, the image data and the layout-processed data and controls the conveyance units and the image formation unit, and to generate the print data based on the control information, the information on the switching to the alternative size printing media and the to-be-printed page number, and outputs the generated print data to the image formation unit.

According to the above aspect, when printing media of a desired size run out during sequential formation of images on the printing media of the desired size, images of the same size are formed on alternative-size printing media. Then, even when the user collectively cuts and separates the alternative-size printing media into his/her desired size, the cut media can be arranged easily according to the print page number. Thus, user-convenience can be improved without increased cost.

DETAILED DESCRIPTION OF EMBODIMENTS

Descriptions are provided hereinbelow for embodiments based on the drawings. In the respective drawings referenced herein, the same constituents are designated by the same reference numerals and duplicate explanation concerning the same constituents is omitted for sake of brevity. All of the drawings are provided to illustrate the respective examples only.

Modes for implementing the invention will become apparent when reading the following description of preferred embodiments in the light of the accompanying drawings. However, the drawings are mainly for illustrative purposes and not intended to limit the scope of the invention.

Embodiment 1

Configuration of Embodiment 1

Figure 2:
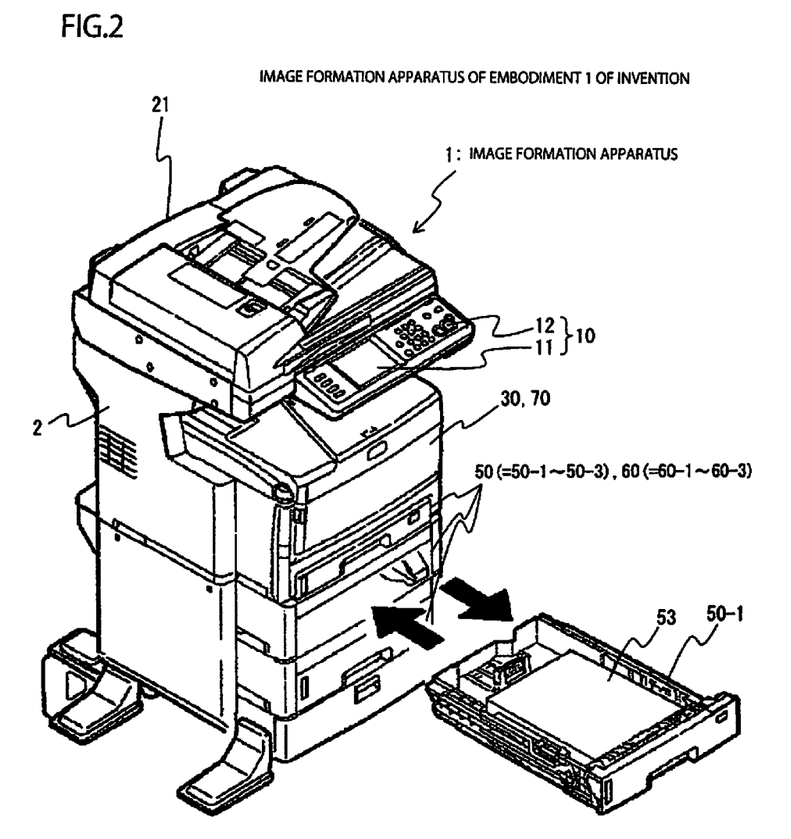
FIG. 2 is a perspective view illustrating an external appearance of the image formation apparatus according to Embodiment 1 of the invention.

FIG. 2 is a perspective view illustrating an external appearance of an image formation apparatus according to Embodiment 1 of the invention.

Image formation apparatus 1 of Embodiment 1 is a multi-function printer (hereinafter referred to as the "MFP") including print paper storage units configured to store print paper as sheet-shaped printing media (print sheets), for example.

Image formation apparatus 1 includes scanner unit 21 provided on top of housing 2 configured to house internal devices. Scanner unit 21 is one of image data input-output units as an image data output unit. Operation unit 10 for a user to operate is provided in the vicinity of scanner unit 21. Operation unit 10 includes: information display unit 11 as a display member such as a liquid crystal (LCD) panel configured to display a series of information; and input and setting unit 12 as an input and setting member including switches and the like and configured to allow the user to input and set information. In an upper part within housing 2, image processing unit 30 and image formation unit 70 are provided. Image processing unit 30 processes image data and the like, and image formation unit 70 forms (i.e., prints) images on print paper 53 as the printing media. In a lower part within housing 2, print paper storage units 50 (=50-1 to 50-3) are provided as a multistage (e.g., three-stage) storage unit so as to be freely inserted and removed. Inside print paper storage units 50, print paper 53 of different sizes, e.g., A4, A3, A5 and the like, is loaded, respectively. Between print paper storage units 50 and image formation unit 70, print paper conveyance units 60 (=60-1 to 60-3) are provided as a multistage (e.g., three-stage) conveyance unit configured to convey print paper 53 inside print paper storage units 50 to image formation unit 70.

Figure 1:
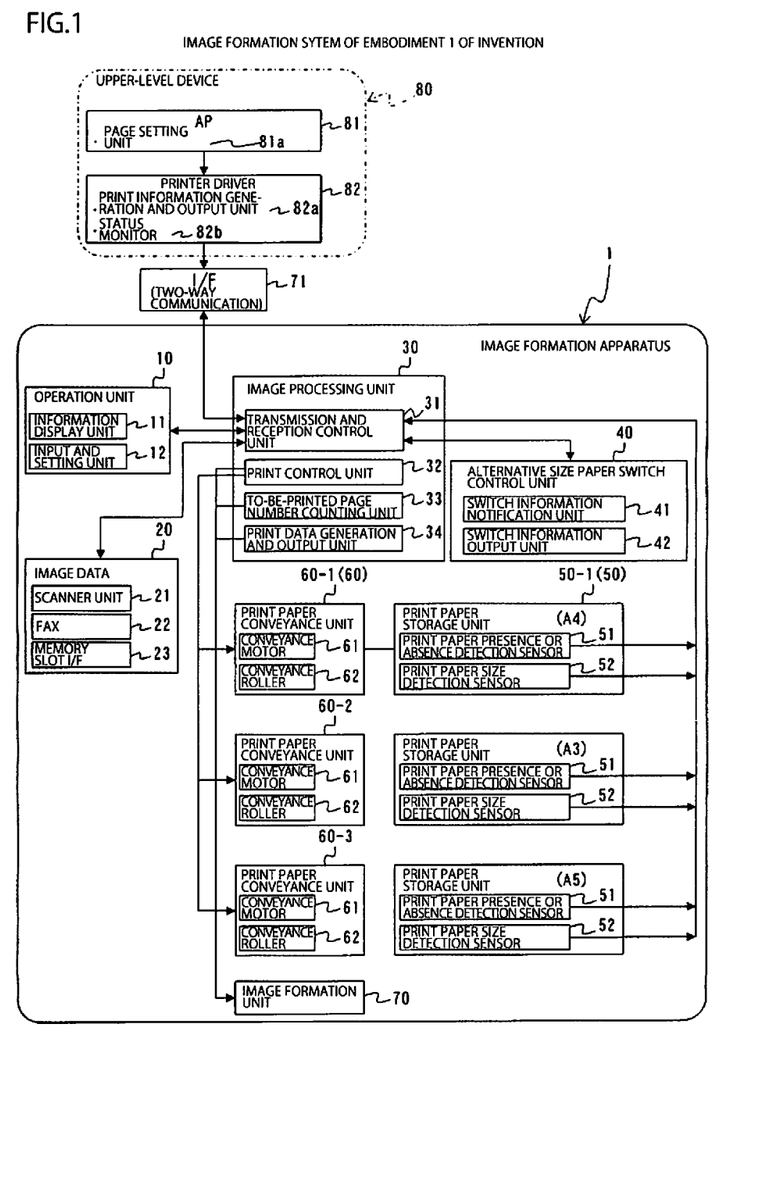
FIG. 1 is a configuration diagram illustrating an image formation system according to Embodiment 1 of the invention including an image formation apparatus illustrated in FIG. 2.

FIG. 1 is a configuration diagram illustrating an image formation system according to Embodiment 1 of the invention including image formation apparatus 1 illustrated in FIG. 2.

The image formation system includes image formation apparatus 1 illustrated in FIG. 2 and upper-level device 80 such as a personal computer connected to image formation apparatus 1 through a two-way communication interface (hereinafter referred to as the "I/F") such as a network and a USB (Universal Serial Bus) cable.

In upper-level device 80, various electronic data created by AP 81 is stored, and also printer driver 82 that is a print drive program, and the like are installed. AP 81 includes page setting unit 81a. In printer driver 82, tools such as print information generation and output unit 82a and status monitor 82b are also installed. Status monitor 82b is a tool that comes with printer driver 82 for the user to monitor and give instructions about the status of image formation apparatus 1 located outside. The electronic data stored in upper-level device 80 is used to generate image data by printer driver 82 so as to be outputted to image processing unit 30 in image formation apparatus 1 through external I/F 71, and the generated image data is sent to image formation apparatus 1.

Image formation apparatus 1 is divided into seven main parts, including: operation unit 10; image data input-output unit 20 as an image data output unit configured to input and output image data; image processing unit 30 connected to operation unit 10, image data input-output unit 20 and external I/F 71; alternative-size paper switch control unit 40 as a size switch control unit connected to image processing unit 30 and configured to control switching of print paper 53 of different sizes; three-stage print paper storage units 50 (=50-1 to 50-3) connected to image processing unit 30; three-stage print paper conveyance units 60 (=60-1 to 60-3) connected to image processing unit 30 and print paper storage units 50 (=50-1 to 50-3); and image formation unit 70 connected to image processing unit 30.

Image data input-output unit 20 is configured to output image data, output print instructions, perform layout processing on print contents, and output data subjected to the layout processing. Image data input-output unit 20 includes: scanner unit 21 configured to read image data on an original image and the like, for example, by using a reading head; facsimile unit (hereinafter referred to as the "FAX") 22 configured to transmit and receive the image data over the telephone lines; and memory slot I/F 23 configured to read image data directly from a memory card and the like. Image data input-output unit 20 and operation unit 10 are communicatively connected to image processing unit 30.

Image processing unit 30 is communicatively connected to operation unit 10, image data input-output unit 20, alternative-size paper switch control unit 40, print paper storage units 50 (=50-1 to 50-3), print paper conveyance units 60 (=60-1 to 60-3), image formation unit 70 and external I/F 71. Image processing unit 30 receives information to switch to alternative-size paper, and transmits the information to information display unit 11. Also, image processing unit 30 counts the number of pages yet to be printed on print paper 53 or the alternative-size paper to obtain a to-be-printed page number. Moreover, image processing unit 30 receives control information including a medium detection signal, a size detection signal, image data and layout-processed data to control three-stage print paper conveyance units 60 (=60-1 to 60-3) and image formation unit 70. Furthermore, image processing unit 30 generates print data based on the control information, the alternative-size paper switch information and the to-be-printed page number, and outputs the generated print data to image formation unit 70.

Image processing unit 30 includes: transmission and reception control unit 31 communicatively connected to operation unit 10, image data input-output unit 20, alternative-size paper switch control unit 40 and external I/F 71, for example; print control unit 32 communicatively connected to print paper conveyance units 60 (=60-1 to 60-3) and image formation unit 70; to-be-printed page number counting unit 33 as a counting unit communicatively connected to image formation unit 70; and print data generation and output unit 34 communicatively connected to image formation unit 70.

Transmission and reception control unit 31 controls transmission and reception of image data and the like from external I/F 71 and image data input-output unit 20, and of control signals thereof. Also, transmission and reception control unit 31 transfers information to operation unit 10 when needed. Moreover, transmission and reception control unit 31 communicates with alternative-size paper switch control unit 40 to display the information on information display unit 11 in operation unit 10 or on status monitor 82b of printer driver 82 in upper-level device 80 via external I/F 71.

Print control unit 32 controls print paper conveyance units 60 (=60-1 to 60-3) and image formation unit 70 by receiving control information including a medium detection signal to be outputted from print paper presence or absence detection sensor 51 as a medium detection sensor, a size detection signal to be outputted from print paper size detection sensor 52 as a size detection sensor, image data to be given by image data input-output unit 20 or upper-level device 80, and layout-processed data to be given by image data input-output unit 20 or upper-level device 80. Also, print control unit 32 has a function to control operations of a print process in accordance with the timing of data output by print data generation and output unit 34.

To-be-printed page number counting unit 33 counts the number of pages yet to be printed to obtain the to-be-printed page number. The to-be-printed page number as a result of the counting is used as a reference parameter for print page layout to be described later. Print data generation and output unit 34 is controlled by print control unit 32. Print data generation and output unit 34 generates print data based on the alternative-size paper switch information acquired from alternative-size paper switch control unit 40 and the to-be-printed page number acquired from the to-be-printed page number counting unit 33, and then outputs the generated print data to image formation unit 70.

Alternative-size paper switch control unit 40 includes switch information notification unit 41 and switch information output unit 42. Alternative-size paper switch control unit 40 prompts the user to input or set certain information by displaying alternative-size paper information on information display unit 11 in operation unit 10 or on status monitor 82b of printer driver 82 in upper-level device 80 via transmission and reception control unit 31 in image processing unit 30.

Each of print paper storage units 50 (=50-1 to 50-3) includes: print paper presence or absence detection sensor 51 configured to detect presence or absence of print paper 53 and output a medium detection signal; and print paper size detection sensor 52 configured to detect the size of loaded print paper 53 and output a size detection signal. As an example illustrated in FIG. 1, A4-size print paper 53 is stored in print paper storage unit 50-1, A3-size print paper 53 is stored in print paper storage unit 50-2, and A5-size print paper 53 is stored in print paper storage unit 50-3.

Each of print paper conveyance units 60 (=60-1 to 60-3) configured to convey print paper 53 includes conveyance motor 61 and conveyance roller 62 to surely convey print paper 53 one by one. Each of print paper conveyance units 60 (=60-1 to 60-3) operates according to instructions of print control unit 32, and conveys target print paper 53 to image formation unit 70. Note that FIGS. 1 and 2 illustrate three-stage print paper storage units 50-1 to 50-3 and three-stage print paper conveyance units 60-1 to 60-3, as an example. However, the number of stages of those units can be increased or reduced at user's request.

Image formation unit 70 has a function to receive print data to be outputted from print data generation and output unit 34 and execute a process of printing an image on the target print paper 53.

Operations of Embodiment 1

Figure 3:
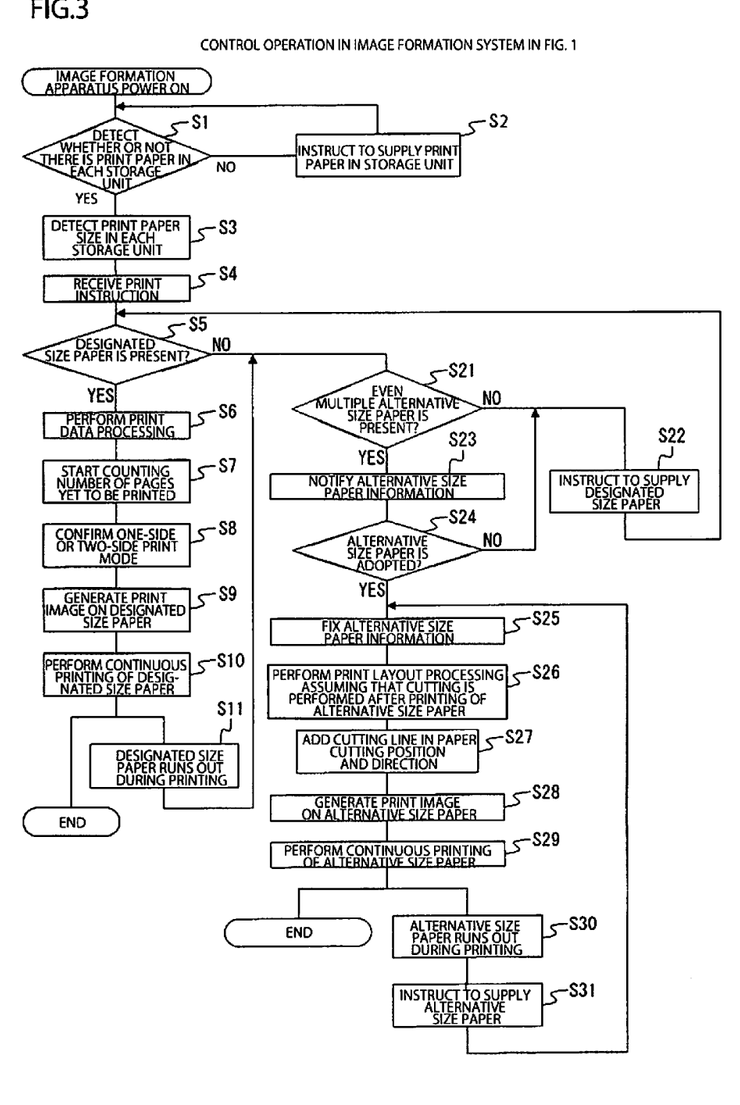
FIG. 3 is a flowchart illustrating a control operation in the image formation system illustrated in FIG. 1.

FIG. 3 is a flowchart illustrating a control operation in the image formation system illustrated in FIG. 1.

Figures 4A, 4B:
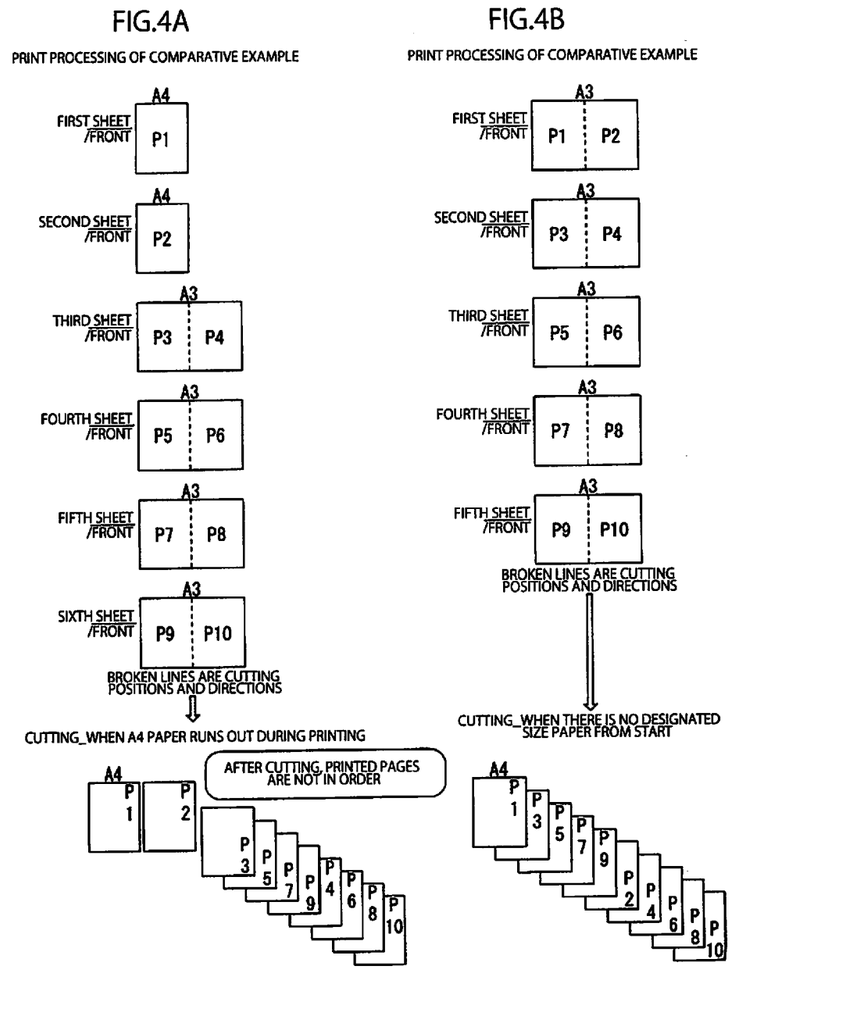
FIGS. 4A and 4B are conceptual diagrams illustrating print processing of a conventional comparative example.

FIGS. 4A and 4B are conceptual diagrams illustrating print processing of a conventional comparative example. FIGS. 4A and 4B illustrate an example of one-side printing for ten pages of print contents with the designated paper size of A4. FIG. 4A illustrates an example where the designated size, i.e., A4 paper runs out during printing, while FIG. 4B illustrates an example where there is no designated size, i.e., A4 paper from the start.

Figure 5A:
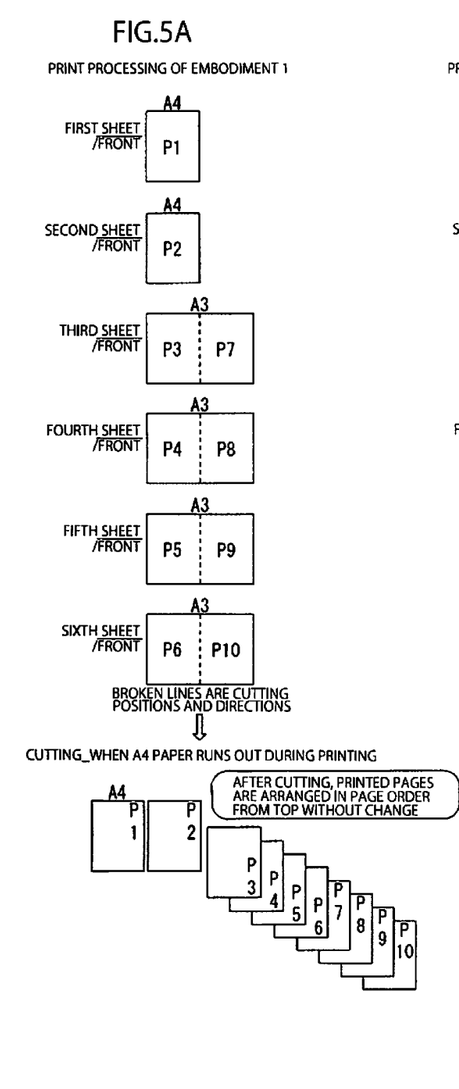
FIGS. 5A and 5B are conceptual diagrams illustrating examples of print processing according to Embodiment 1 of the invention.
Figure 5B:
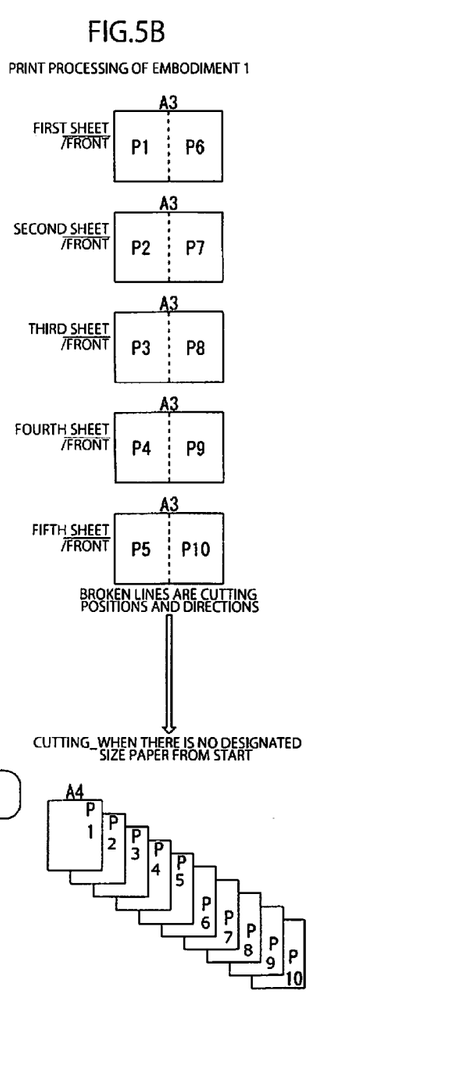
Figures 6A, 6B:
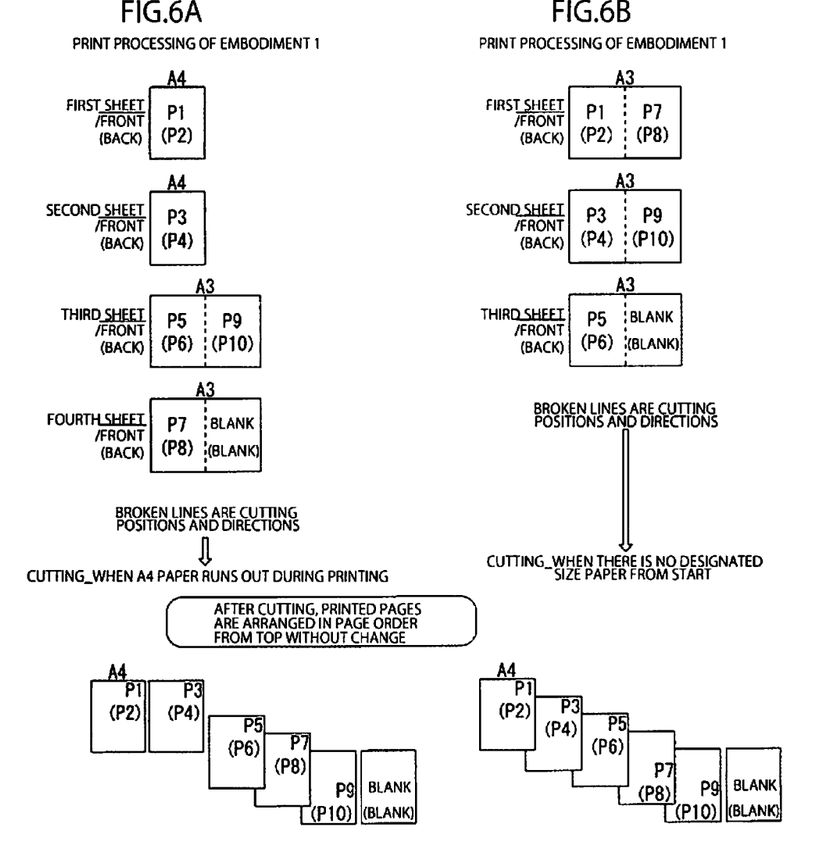
FIGS. 6A and 6B are conceptual diagrams illustrating examples of print processing according to Embodiment 1 of the invention.

FIGS. 5A and 5B and FIGS. 6A and 6B are conceptual diagrams illustrating an example of print processing according to Embodiment 1 of the invention. FIGS. 5A and 5B illustrate an example of one-side printing for ten pages of print contents with the designated paper size of A4. FIG. 5A illustrates an example where the designated size, i.e., A4 paper runs out during printing, while FIG. 5B illustrates an example where there is no designated size, i.e., A4 paper from the start. FIGS. 6A and 6B illustrate an example of two-side (long-side-bound) printing for ten pages of print contents with the designated paper size of A4. FIG. 6A illustrates an example where the designated size, i.e., A4 paper runs out during printing, while FIG. 6B illustrates an example where there is no designated size, i.e., A4 paper from the start.

With reference to FIGS. 4, 5A, 5B, 6A and 6B, the control operation illustrated in the flowchart of FIG. 3 is described below.

In the flowchart of FIG. 3, immediately after the power of image formation apparatus 1 is turned on, a series of check processes to start up image formation apparatus 1 are performed. In Step S1, for example, it is detected whether or not there is print paper 53 in each of print paper storage units 50. This detection process in Step S1 is executed by print paper presence or absence detection sensor 51 included in each of print paper storage units 50. When there is no print paper 53 (when print paper is absent) in any one of print paper storage units 50, print control unit 32 allows information display unit 11 in operation unit 10 to display information indicating that there is no paper in the storage unit in Step S2 to reflect the result of the detection, and instructs the user to supply the print paper. Thereafter, in Step S3, print control unit 32 allows print paper size detection sensor 52 to detect the size of print paper 53 in print paper storage unit 50 detected to have print paper 53 stored therein, and then proceeds to Step S4. The detected size information can be displayed on information display unit 11 in operation unit 10 via transmission and reception control unit 31.

In Step S4, image processing unit 30 receives a print instruction. As a route to receive the print instruction, the instruction is received from any one of scanner unit 21, FAX 22 or memory slot I/F 23 in image data input-output unit 20, or from printer driver 82 in upper-level device 80 via external I/F 71. Here, the original size read by scanner unit 21, the original size received by FAX 22 and the size of the image data from memory slot I/F 23 are all controlled as the print designated size. Moreover, information on the size set by the user using page setting unit 81a of AP 81 in upper-level device 80 is also controlled as the print designated size through processing by printer driver 82. Upon receipt of the print instruction, the processing proceeds to Step S5.

In Step S5, print control unit 32 receives a medium detection signal from print paper size detection sensor 52 in each of print paper storage units 50 through transmission and reception control unit 31, and checks if there is paper of the designated paper size in each of print paper storage units 50. In other words, print control unit 32 compares the received signal with the size information on print paper 53 loaded in each of print paper storage units 50 detected in Step S3. Then, if the both coincide, print control unit 32 determines that there is designated size paper (Yes) and proceeds to print data processing in Step S6. On the other hand, if the signal does not coincide with any of the sizes of print paper 53 in print paper storage units 50 (No), print control unit 32 determines that there is no designated size paper and proceeds to Step S21.

When it is determined that there is designated size paper, print control unit 32 and print data generation and output unit 34 perform a series of print data processing in Step S6 such as conversion, compression and decompression on image data through transmission and reception control unit 31, and then proceeds to Step S7. In Step S7, to-be-printed page number counting unit 33 counts the number of pages required in one print job, stores the number in image processing unit 30, and then proceeds to Step S8. In Step S8, upon confirmation of a one-side print mode or a two-side print mode specified by the print instruction, print control unit 32 rotates conveyance motor 61 in print paper conveyance unit 60 corresponding to designated size print paper 53. Accordingly, conveyance roller 62 driven by the motor starts its rotation to convey print paper 53 to image formation unit 70. Then, the processing proceeds to Step S9. In Step S9, image formation unit 70 generates a print image on the designated size paper through a series of image formation processes based on the print data received from print data generation and output unit 34, and then proceeds to the next step S10 for continuous printing of the designated size paper. In Step S10, image formation unit 70 repeats the series of image formation processes to continuously print images on the designated size paper page by page.

To-be-printed page number counting unit 33 continues to count the remaining number of pages yet to be printed by subtraction even during the continuous printing in Step S10. When the count value reaches zero, this means that there is no more pages yet to be printed (i.e., that printing of print paper 53 of the size designated in this print process is completed). Then, the print process is terminated when the last page is discharged.

However, there are also many cases where the designated size paper runs out during the continuous printing process in Step S10 (Step S11). Such a case corresponds to the situation where it is determined that there is no designated size paper (No) in Step S5. Normally, image formation apparatus 1 suspends the printing here and notifies the user to supply print paper 53 of the designated size by using information display unit 11 and status monitor 82b in upper-level device 80. However, there is also a case where print paper 53 of the designated size is not immediately available. This causes the user to cancel the printing in the middle of the printing process, which could be detrimental to work and the like.

To avoid such a situation, the processing proceeds to the next Step S21 in Embodiment 1. In Step S21, print control unit 32 receives a size detection signal from print paper size detection sensor 52 through transmission and reception control unit 31, and first checks if there is alternative paper of a size that is an even multiple of the designated size. For example, when print paper 53 of the designated size A5 runs out, print control unit 32 checks if there is A4 paper which is twice the size of A5 in print paper storage units 50-1 to 50-3. When there is no A4 paper, print control unit 32 checks if there is A3 paper which is four times as large as the designated size A5 in print paper storage units 50-1 to 50-3. If it is still determined that there is no paper in print paper storage units 50 (No), the processing proceeds to Step S22. In Step S22, print control unit 32 notifies the user of an instruction to supply the designated size paper in print paper storage units 50 by using information display unit 11 and status monitor 82b in upper-level device 80 through transmission and reception control unit 31, and then returns to Step S5.

On the other hand, when determining in Step S21 that there is alternative paper of the size that is an even multiple of the designated size (Yes), print control unit 32 proceeds to Step S23. In Step S23, switch information notification unit 41 in alternative size paper switch control unit 40 first notifies the user of information on the alternative size paper (i.e., information on paper size that is an even multiple of the designated size) by using information display unit 11 and status monitor 82b in upper-level device 80 through transmission and reception control unit 31. Then, in the next Step S24, switch information notification unit 41 allows the user to determine whether to keep using the alternative size paper. When determining that the alternative size paper is not to be used if it is not urgent or if there is still designated size paper left (No), the user issues an instruction "not to be used" through transmission and reception control unit 31 by using information display unit 11, input and setting unit 12 and status monitor 82b in upper-level device 80. When the instruction is issued, the processing proceeds to Step S22. In Step S22, print control unit 32 instructs the user to supply the original designated size paper in print paper storage units 50, since the alternative size paper is not to be used, by using information display unit 11 and status monitor 82b in upper-level device 80.

When determining in Step S24 that the alternative size paper is to be used if the user finds out that the designated size paper is not immediately available or he/she wants to have the printed matter immediately (Yes), the user issues an instruction "to be used" through transmission and reception control unit 31 by using information display unit 11, input and setting unit 12 and status monitor 82b in upper-level device 80. When the instruction is issued, the processing proceeds to Step S25. In Step S25, the alternative size paper information is fixed, and thus print control unit 32 notifies the alternative size paper information to image data input-output unit 20 and printer driver 82 in upper-level device 80 through transmission and reception control unit 31.

As print processing in subsequent steps S26 to S31, print processing in the comparative example is first briefly described as illustrated in FIGS. 4A and 4B.

As an example, in one-side printing for ten pages of print contents with the designated paper size A4, even when the designated size A4 paper runs out during printing or when there is no designated size A4 paper from the start, printing of the remaining pages is performed by switching to paper of a size that is an even multiple of A4 size (here, A3 paper which is twice the size of A4). However, the layout for the A3 paper remains the same as the page order for the remaining print contents. In this case, if the user folds the A3 size paper in the middle and binds the paper on the left side after the completion of printing, the paper can be arranged according to the page number (P1 to P10) of the print contents. However, when the user collectively cuts the paper into his/her desired size (here, A4 size), the page order (P1 to P10) after the collective cutting is P1-P2-P3-P5-P7-P9-P4-P6-P8-P10 as illustrated in FIG. 4A when the designated size A4 paper runs out during printing. Meanwhile, when there is no designated size A4 paper from the start, the page order is P1-P3-P5-P7-P9-P2-P4-P6-P8-P10 as illustrated in FIG. 4B. Accordingly, the user cannot easily arrange the pages in a correct order without sorting out the page order (P1 to P10) each time.

In order to resolve such inconvenience, the print processing of Embodiment 1 is performed as follows as illustrated in FIGS. 5A and 5B and FIGS. 6A and 6B.

As illustrated in FIGS. 5A and 5B and FIGS. 6A and 6B, even when the designated size A4 paper runs out during printing or when there is no designated size A4 paper from the start, to-be-printed page number counting unit 33 notifies information on the number of pages yet to be printed to image data input-output unit 20 and printer driver 82 in upper-level device 80 through transmission and reception control unit 31, when the alternative size paper information is fixed, in Step S25 in FIG. 3. Then, the processing proceeds to Step S26. In Step S26, image data input-output unit 20 or printer driver 82 in upper-level device 80 performs print layout processing based on the premise that the user performs collective cutting after printing of pages yet to be printed, for the alternative size paper. Thereafter, the processing proceeds to Step S27.

In other words, as in the example illustrated in FIGS. 5A, 5B, 6A and 6B, to-be-printed page number counting unit 33 counts the number of pages to be printed and the page numbers (P1 to P10) are automatically arranged on a sheet of the alternative size A3 paper, so that the pages can be easily arranged after collective cutting, rather than printing according to consecutive page numbers (P1 to P10). Then, in order to cut the alternative size paper, image data input-output unit 20 or printer driver 82 in upper-level device 80 adds cutting lines (indicated by broken lines in the illustrated example) indicating positions and directions of cutting in Step S27. Note that the addition of the cutting lines (broken lines) is performed on a print surface in the case of one-side printing, and may be performed only on a front surface also in the case of two-side printing. More specifically, in the two-side printing, the presence or absence of the cutting lines (broken lines) makes it possible to easily tell the front from the back at a glance after the printing, and is used in collective cutting to be described later.

Next, image data input-output unit 20 or printer driver 82 in upper-level device 80 sends the alternative size information, page layout information on the alternative size paper, page order information, information on the added cutting lines and data on one-side print mode information or two-side print mode information to print control unit 32 again through transmission and reception control unit 31. Then, print control unit 32 and print data generation and output unit 34 perform a series of processing such as conversion, compression and decompression on the image data, and print data generation and output unit 34 outputs print data as a result of the processing to image formation unit 70. In this event, to-be-printed page number counting unit 33 continues to count the number of pages yet to be printed for the alternative size paper. Furthermore, print control unit 32 rotates conveyance motor 61 in print paper conveyance unit 60 corresponding to alternative size print paper 53. Accordingly, conveyance roller 62 driven by the motor starts its rotation to convey print paper 53 to image formation unit 70.

In Step S28, image formation unit 70 prints a print image on the alternative size paper through a series of image formation processes based on the print data received from print data generation and output unit 34. Then, the processing proceeds to continuous printing of the alternative size paper in Step S29. In Step S29, image formation unit 70 repeats the series of image formation processes to continuously print pages of images without changing the size on the alternative size paper.

In the case of one-side printing illustrated in FIGS. 5A and 5B, for example, the pages can be easily arranged from page P1 to page P10 without changing the page order of the contents printed on one side of the A4 size paper after the user collectively cuts the alternative size A3 paper, either when the designated size A4 paper runs out during printing as illustrated in FIG. 5A or when there is no designated size A4 paper from the start as illustrated in FIG. 5B. On the other hand, in the case of two-side (long-side-bound) printing illustrated in FIGS. 6A and 6B, the pages can be easily arranged from page P1 to page P10 without changing the page order of the contents printed on both sides of the A4 size paper after the user collectively cuts the alternative size A3 paper, either when the designated size A4 paper runs out during printing as illustrated in FIG. 6A or when there is no designated size A4 paper from the start as illustrated in FIG. 6B.

Here, to-be-printed page number counting unit 33 continues to count the remaining number of pages yet to be printed by subtraction even during the continuous printing in Step S29. When the count value reaches zero, this means that there is no more pages yet to be printed, i.e., printing of print paper 53 of the alternative size in this print process is completed. Then, the print process is terminated when the last page is discharged. However, when the alternative size paper also runs out during the continuous printing in Step S30, image formation apparatus 1 suspends the printing and proceeds to Step S31. In Step S31, print control unit 32 instructs the user to supply the alternative size paper by using information display unit 11 and status monitor 82b in upper-level device 80 through transmission and reception control unit 31. When the user supplies the alternative size paper and then the supply is detected by print paper size detection sensor 52 in print paper storage unit 50, the processing returns to Step S25 and the printing of the alternative size paper is resumed.

Advantageous Effects of Embodiment 1

According to image formation apparatus 1 and the image formation system of Embodiment 1, alternative size paper that is an even multiple of the designated size paper is automatically detected and the user is encouraged to print on the alternative size paper in either case of when the designated size paper runs out during printing or when there is no designated size paper from the start. Furthermore, layout of pages yet to be printed based on the premise that the user collectively cuts the alternative size paper after printing and automatic adjustment of page order are performed. Thus, the pages can be easily arranged from the first page to the last page without changing the page order of the contents printed on one side or both sides of the original designated size paper after the user collectively cuts the alternative size paper. As a result, user-convenience can be improved without increase in cost.

Embodiment 2

In Embodiment 1, when the pages are arranged in the same direction of the print contents after the user collectively cuts the alternative size paper having images printed thereon, cut planes are not in order and cannot be arranged in one direction. This leads to poor user-convenience and poor appearance. Such downsides are overcome in Embodiment 2 of the invention.

Configuration of Embodiment 2

Image formation apparatus 1 and an image formation system according to Embodiment 2 have approximately the same configurations as those of Embodiment 1 illustrated in FIGS. 1 and 2. Embodiment 2 is different from Embodiment 1 in the layout processing function of image data input-output unit 20 and printer driver 82 in upper-level device 80 in FIG. 1 for print contents on the alternative size paper. Such a difference in layout processing function is described in the following description of operations.

Operations of Embodiment 2

Figure 7:
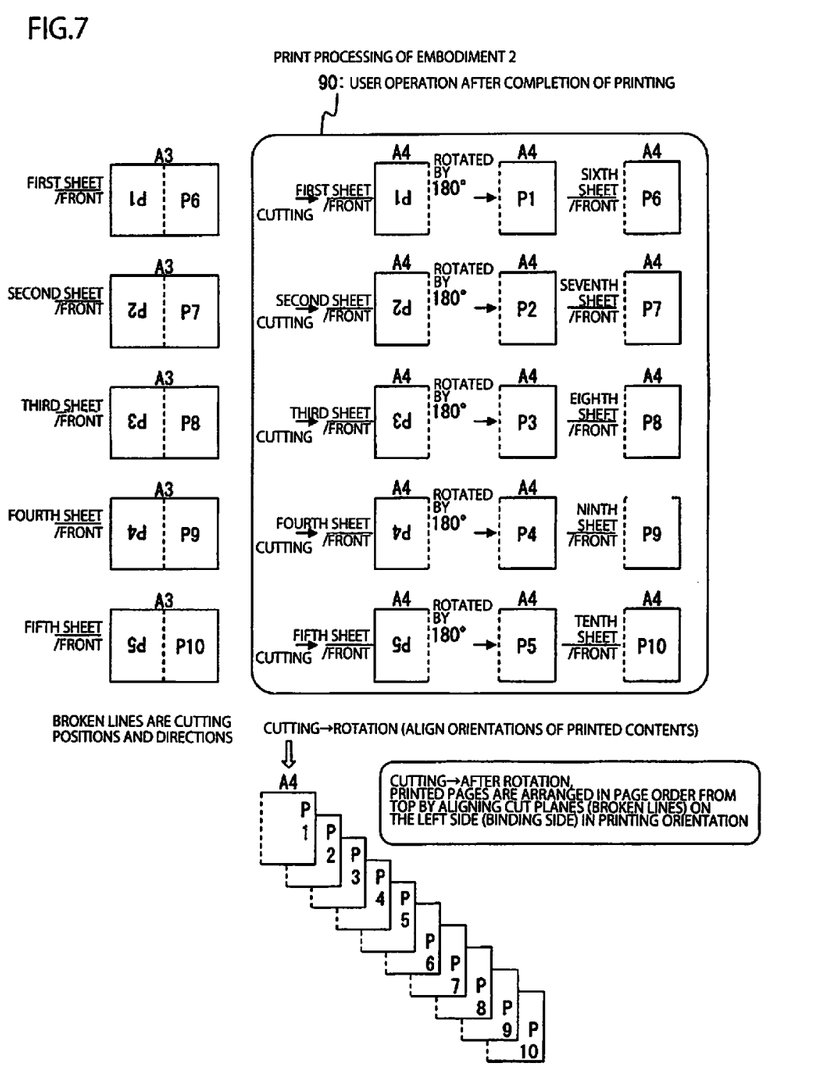
FIG. 7 is a conceptual diagram illustrating an example of print processing according to Embodiment 2 of the invention.
Figure 8:
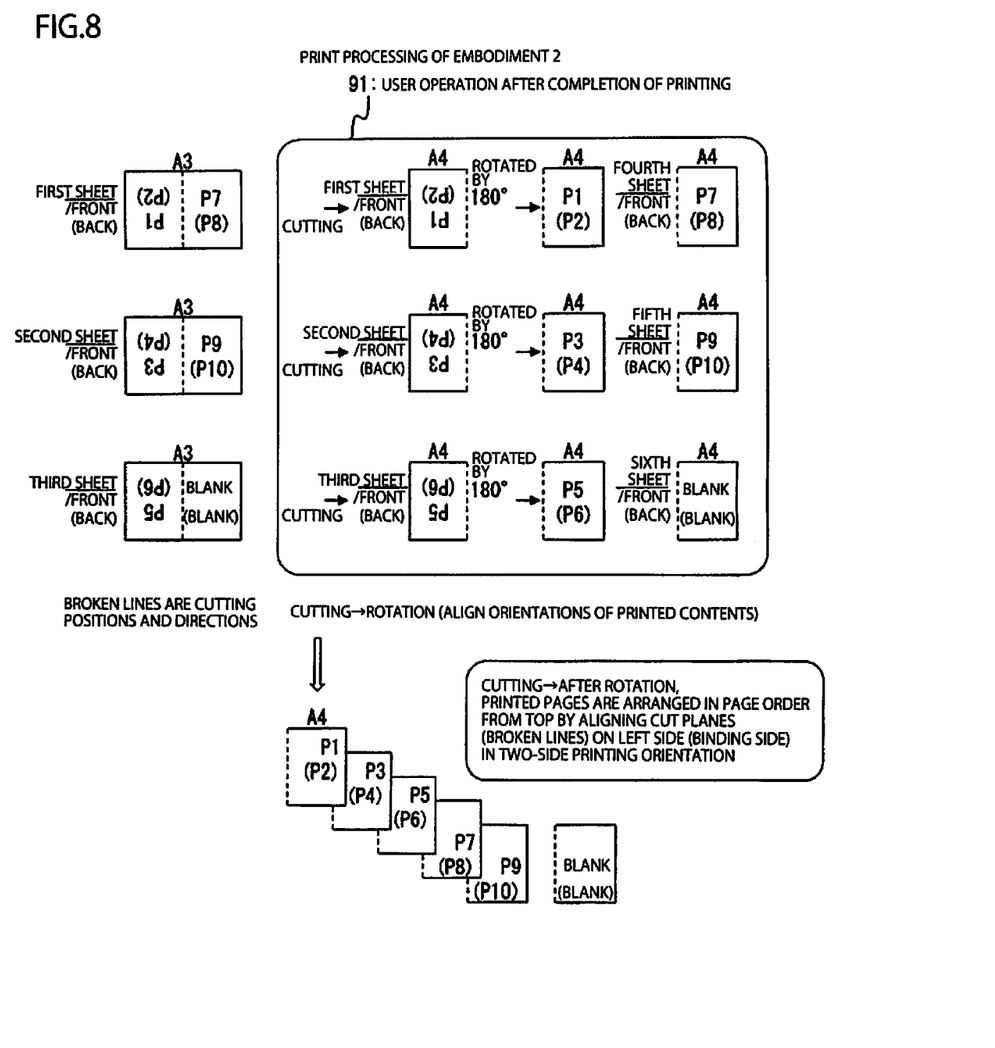
FIG. 8 is a conceptual diagram illustrating an example of print processing according to Embodiment 2 of the invention.

FIGS. 7 and 8 are conceptual diagrams illustrating an example of print processing according to Embodiment 2 of the invention. FIG. 7 illustrates an example of one-side printing for ten pages of print contents with a designated paper size A4. FIG. 8 illustrates an example of two-side (long-side-bound) printing for ten pages of print contents with the designated paper size A4. Note that, in both of FIGS. 7 and 8, description is given of the case where there is no designated size paper from the start while omitting the case where the designated size paper runs out during printing.

In a control operation by the image formation system of Embodiment 2, a different method is used for the print layout processing in Step S26 in the flowchart of FIG. 3 illustrating the control operation of Embodiment 1. Thus, such a difference is described.

After the alternative size paper information is fixed in Step S25 in the flowchart of FIG. 3, the processing proceeds to Step S26. In Step S26, as described in Embodiment 1, to-be-printed page number counting unit 33 in FIG. 1 notifies information on the number of pages yet to be printed to image data input-output unit 20 and printer driver 82 in upper-level device 80 through transmission and reception control unit 31. Then, image data input-output unit 20 or printer driver 82 in upper-level device 80 performs print layout processing based on the premise that the user performs collective cutting after printing of pages yet to be printed, for the alternative size paper. In the print layout processing, to-be-printed page number counting unit 33 counts the number of pages yet to be printed and the page numbers are automatically adjusted on a sheet of the alternative size A3 paper, so that the pages can be easily arranged after collective cutting, rather than printing according to consecutive page numbers.

In the layout processing here, in the case of one-side printing illustrated in FIG. 7, while contents of pages P1 and P6 are printed on a sheet of the A3 paper, the orientation of the print contents on page P1 is inverted upside down and the contents are laid out in an orientation opposite to the contents on page P6. The layout processing is similarly performed for the subsequent pages. Specifically, orientations of print contents on pages P2, P3, P4 and P5 are also inverted upside down, and the contents are laid out in orientations opposite to the contents on pages P7, P8, P9 and P10, respectively. Note that the processing after Step S27 in FIG. 3 is the same as that of Embodiment 1, and thus description thereof is omitted here.

The layout processing is similarly performed also in the case of two-side printing illustrated in FIG. 8. Specifically, the orientation of the contents of (Page P2) printed in the back of the opposite side at the same position as page P1 printed in the front of the first sheet is inverted upside down, and the contents are laid out in an orientation opposite to that of the contents on page P7 (page P8). Similarly, the orientations of the print contents on page P3 (page P4) and page P5 (page P6) are also inverted upside down, and the contents are laid out in orientations opposite to the contents on page P7 (page P8) and page P9 (page P10).

By such layout processing of inverting the printing orientation upside down, after the user performs collective cutting along cutting lines (broken lines) provided only on the front surface of the paper, the pages are easily and neatly arranged according to print page numbers from above with the cut planes (broken line side) on the left side (binding side) in the printing orientation when pages P1 to P5 are collectively rotated by 180° as a user operation 90 after the completion of printing in the case of one-side printing illustrated in FIG. 7 and page P1 (page P2), page P3 (page P4) and page P5 (page P6) are collectively rotated by 180° as a user operation 91 after the completion of printing in the case of two-side printing illustrated in FIG. 8.

Here, as another example, description is given of the case where printing is performed using paper four times as large as the designated size paper, as alternative paper of a size that is an even multiple of the designated size paper.

Figure 9:
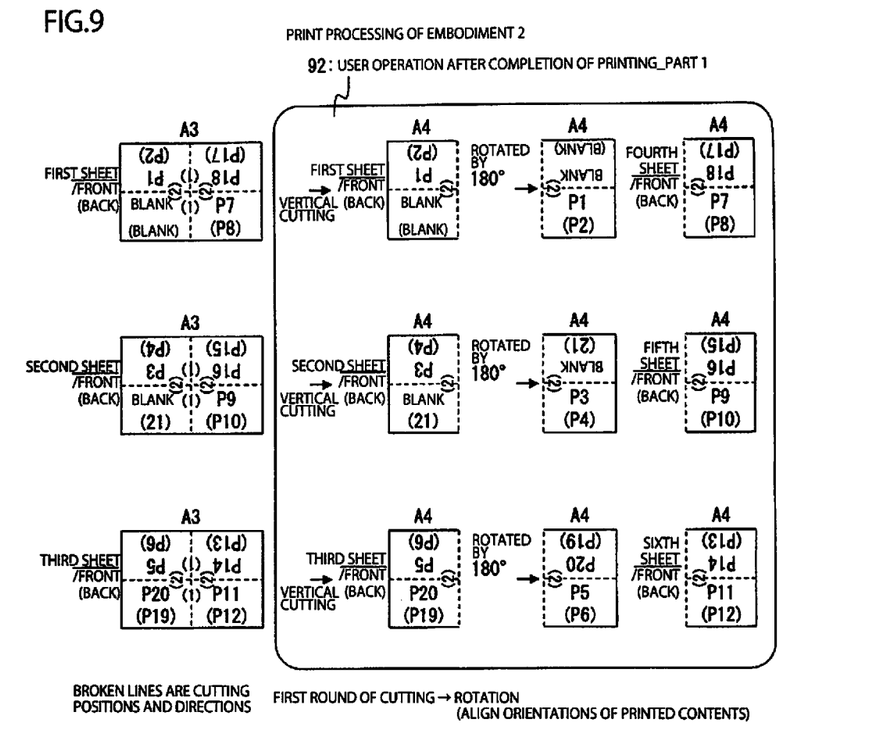
FIG. 9 is a conceptual diagram illustrating an example of print processing according to Embodiment 2 of the invention.
Figure 10:
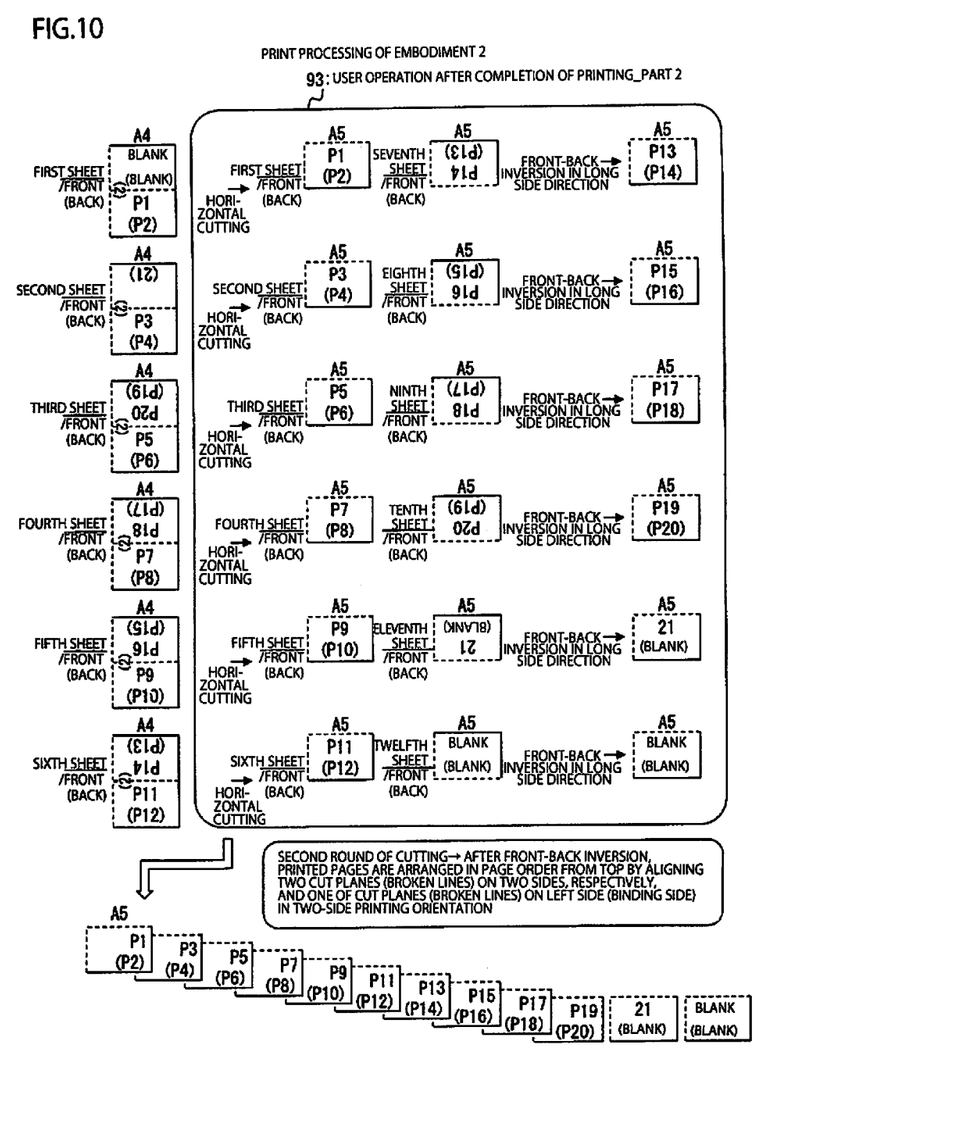
FIG. 10 is a conceptual diagram illustrating an example of print processing according to Embodiment 2 of the invention.

FIGS. 9 and 10 are conceptual diagrams illustrating an example of print processing according to Embodiment 2 of the invention. FIGS. 9 and 10 illustrate an example where there is no designated size paper from the start in two-side (short-side-bound) printing for twenty pages of print contents with the designated paper size A5.

In Step S21 of FIG. 3, print control unit 32 checks information on the size of paper supplied in each of print paper storage units 50 to see if there is alternative paper of a size that is an even multiple of the designated size, based on a size detection signal from print paper size detection sensor 52 in each of print paper storage units 50 through transmission and reception control unit 31. Accordingly, print control unit 32 first determines whether or not there is A4 paper which is twice the size of the designated size paper A5. However, when it is found out that there is no A4 paper in print paper storage units 50, print control unit 32 checks if there is A3 paper which is four times as large as the designated size A5. When it is determined that there is A3 paper (Yes), the processing proceeds to Step S23. In Step S23, print control unit 32 sends the alternative size A3 paper information to information display unit 11 and status monitor 82b in upper-level device 80 through transmission and reception control unit 31 to notify the user, and then proceeds to Step S24. In Step S24, print control unit 32 determines through transmission and reception control unit 31 whether or not the user uses the alternative size A3 paper. If the user uses the A3 paper (Yes), storage information on the alternative size A3 paper is fixed in Step S25. Then, in Step S26, image data input-output unit 20 or printer driver 82 in upper-level device 80 performs print layout processing.

In layout processing here, since two-side printing is performed from A5 to A3, eight pages of contents of A5 size are printed on the front and back of one sheet of A3 paper. Moreover, as illustrated in user operation after completion of printing_Part 1 denoted by reference numeral 92 in FIG. 9, collective cutting from A3 into A5 needs to be performed twice after the completion of printing. Also in this case, two cutting lines (broken lines) are provided only on the front side. However, there is also a possibility that, depending on the order in the cutting direction, the page order in arrangement at the end is changed. To prevent this, when two or more cutting lines (broken lines) are added, the respective cutting lines (broken lines) are numbered in order of cutting so as to clarify the order of paper cutting in accordance with the order of print layout. As is clear from the example of FIG. 9, (1) is assigned to the vertical broken line that divides the A3 paper into two right and left parts in the horizontal direction of the paper, while (2) is assigned to the horizontal broken line that divides the paper into two top and bottom parts.

In the layout, print contents of upper left page P1, upper right page P18, lower left blank page and lower right page P7 are laid out on the front of the first sheet of A3 paper, while print contents of the upper left (page P2), upper right (page P17), lower left (blank page) and lower right (page P8) are laid out on the back. Here, orientations of the print contents of the upper left page P1 (page P2) and upper right page P18 (page P17) are inverted upside down and the contents are laid out in an orientation opposite to the print contents of the lower left blank page (blank page) and lower right page P7 (page P8), so that the cut planes (broken line side) are arranged on the same side after the collective cutting. Moreover, on the same print side, page P1 and page P7 are diagonally laid out as odd-numbered pages and page P18 and blank page as even-numbered pages on the front side. Similarly, on the back side, (page P2) and (page P8) are diagonally laid out as even-numbered pages and (page P17) and (blank page) are diagonally laid out as odd-numbered pages. The reason for such layout is described in cutting processing to be described later.

Subsequently, as illustrated in FIG. 9, layout processing for the second and third sheets of the A3 size paper is also performed using the same method. However, twenty-one A5-size pages of print contents are subjected to two-side printing in the A3 size that is four times as large as the A5 size. Thus, blank page areas not to be printed appear in three spots on the front and back sides as areas for the A5 size. The blank page areas are designed to be the last page after the predetermined cutting order and arrangement operation are performed.

Next, as illustrated in user operation after completion of printing_Part 1 denoted by reference numeral 92 in FIG. 9, when the user performs a collective cutting operation for three sheets of A3 paper printed using the layout method described above, the three sheets of A3 size paper are converted into six sheets of A4 size paper by performing a first cutting operation along No. (1) cutting line. Then, when the user rotates three sheets of A4 paper on the left side by 180° and then puts the sheets on three sheets of A4 paper on the right side, No. (1) cut planes (broken line side) are aligned on the same side (on the left side) in all of the six sheets of A4 paper.

Furthermore, as illustrated in user operation after completion of printing_Part 2 denoted by reference numeral 93 in FIG. 10, six sheets of A4 size paper are converted into twelve sheets of originally designated A5 size paper by performing a second cutting operation along No. (2) cutting line. Then, when the user flips upper six sheets of A5 paper in the long side direction and then puts the sheets under the six sheets of A5 paper on the left side, No. (1) and No. (2) cut planes (broken line side) are aligned on the same sides (left side (1) and upper side (2)) in all of the twelve sheets of A5 paper. Thus, the original designated size A5 paper can be printed on both sides, front and back, in the page order of print contents from above. Moreover, the two cut planes (broken line side) are also arranged on the same sides.

Advantageous Effects of Embodiment 2

According to image formation apparatus 1 and the image formation system of Embodiment 2, in printing by switching from the designated size paper to alternative size paper having a size that is an even multiple of the designated size paper, image data input-output unit 20 or printer driver 82 in upper-level device 80 further adds numbers (1) and (2) to cutting lines (broken lines) added to the front side when two or more cutting operations are performed, depending on which one of the one-side print mode and the two-side print mode is selected, in consideration of the collective cutting operation by the user after printing, thereby automatically adjusting the order of printed pages and the printing orientation on each of the alternative size paper. Therefore, when the pages are arranged by aligning the print contents in the same orientation, the cut planes (broken line side) can also be arranged on the same sides, respectively. As a result, good-looking printed matter can be realized with a user-friendly, simple way. Thus, the user-convenience can be further improved without increase in cost.

Modified Example

The invention is not limited to Embodiments 1 and 2 described above, but various utilization modes and modifications are possible. Such utilization modes and modifications include the following (a) and (b), for example.

(a)

Image formation apparatus 1 and upper-level device 80 in FIG. 1 may be changed to circuit configurations other than those illustrated in FIG. 1. For example, operation unit 10 and image data input-output unit 20 are removed from image formation apparatus 1 illustrated in FIG. 1, and the operation unit 10 and image data input-output unit 20 may be provided outside image formation apparatus 1. In this case, functions of externally provided operation unit 10 and image data input-output unit 20 are executed by upper-level device 80, for example.

(b)

In Embodiments 1 and 2, the description was given of the printing medium conveyor structure and operating principles by taking the MFP as an example. However, actual application is not limited to the MFP but the invention is also applicable to printers such as an electrophotographic printer, an ink jet printer, an impact printer and a thermal printer, and also to an image formation apparatus such as a FAX.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

The invention claimed is:

1. An image formation apparatus comprising:
   storage units configured to store printing media therein;
   medium detection sensors provided in the respective storage units and each configured to detect whether or not there is a printing medium in the corresponding storage unit and output a medium detection signal;
   size detection sensors provided in the respective storage units and each configured to detect the size of the printing media in the corresponding storage unit and output a size detection signal;
   an image formation unit configured to receive print data and print images on the printing media;
   conveyance units each configured to convey the printing media in the corresponding storage unit toward the image formation unit;
   a display unit configured to receive display information including information on switching to the printing media and display the display information;
   an input and setting unit configured to receive a user input;
   an image data output unit configured to output image data, perform layout processing of print contents of the image data, and output layout-processed data of the layout processing;
   a size switch control unit configured to control switching to alternative size printing media detected by the size detection sensor and output information on the switching to the alternative size printing media; and
   an image processing unit, wherein
   the image processing unit:
   receives the information on the switching to the alternative size printing media and transmits the information to the display unit,
   obtains a to-be-printed page number by counting the number of pages yet to be printed in the printing media or the alternative size printing media,
   receives control information including the medium detection signal, the size detection signal, the image data and the layout-processed data and controls the conveyance units and the image formation unit, and generates the print data based on the control information, the information on the switching to the alternative size printing media and the to-be-printed page number, and outputs the generated print data to the image formation unit.

2. The image formation apparatus according to claim 1, wherein the image processing unit includes
a transmission and reception control unit configured to receive the information on the switching to the alternative size printing media and transmit the information to the display unit, and to transmit and receive signals between the display unit, the input and setting unit, the image data output unit and the size switch control unit,
a print control unit configured to receive the control information and control the conveyance units and the image formation unit,
a counting unit configured to obtain the to-be-printed page number by counting the number of pages yet to be printed, and
a print data generation and output unit controlled by the print control unit and configured to generate the print data based on the information on the switching to the alternative size printing media and the to-be-printed page number, and to output the generated print data to the image formation unit.

3. The image formation apparatus according to claim 1, wherein when the print control unit detects that printing media of a designated size specified by the image data output unit runs out during printing or does not exist from the start, the print control unit searches for the printing media of a size that is an even multiple of the designated size based on the size detection signal, and prompts a user through the display unit as to whether to continue the printing using the searched-out media as the alternative size printing media if the searched-out media is determined to exist in the image formation apparatus.

4. The image formation apparatus according to claim 1, wherein in the layout processing by the image data output unit, layout processing is performed without changing the size, such that an even number of page contents corresponding to one side per alternative size printing medium are laid out based on the to-be-printed page number and a one-side print mode or a two-side print mode.

5. The image formation apparatus according to claim 4, wherein the layout processing is performed without enlarging or reducing the size.

6. The image formation apparatus according to claim 1, wherein in the layout processing by the image data output unit, layout processing is performed on the alternative size printing media in which layout order is adjusted based on the premise that the user performs a collective cutting operation after completion of printing.

7. The image formation apparatus according to claim 1, wherein in the layout processing by the image data output unit, a cutting line is added on the front side of an alternative size printing medium along a cutting position in a cutting direction on the alternative size printing medium; and when there are two or more cutting lines, numbers are assigned to the cutting lines so as to indicate the priority of cutting.

8. The image formation apparatus according to claim 1, wherein in the layout processing by the image data output unit, when there is a blank page area in an alternative size printing medium, layout processing is performed such that the blank page area comes last in the page order of print contents after collective cutting and arrangement operations.

9. The image formation apparatus according to claim 1, wherein in the layout processing by the image data output unit, layout processing is performed such that the cut sides of alternative size printing media are aligned on one and the same side after the alternative size printing media are collectively cut and arranged in the page order of print contents.

10. The image formation apparatus according to claim 1, wherein the display unit, the input and setting unit, and the image data output unit are provided outside the image formation apparatus.

11. An image formation system comprising:
the image formation apparatus according to claim 1; and
an upper-level device,
wherein the image formation apparatus and the upper-level device are connected through a two-way communication interface,
wherein the upper-level device includes
a display unit having the same function as that of the display unit in the image formation apparatus,
an input and setting unit having the same function as that of the input and setting unit in the image formation apparatus, and
an image data output unit having the same function as that of the image data output unit in the image formation apparatus.

12. The image formation system according to claim 11, wherein the input and setting unit in the upper-level device is a page setting unit provided in an application program and configured to set information including the size of the printing media,
the image data output unit in the upper-level device is a printer driver configured to perform layout processing of the print contents based on a print instruction from the application program and to output the layout-processed data of the layout processing, and
the display unit in the upper-level device is a status monitor provided in the printer driver and configured to display relevant information on the image formation apparatus and receive an input by the user.

* * * * *